United States Patent Office 3,431,264
Patented Mar. 4, 1969

3,431,264
9-CYANOACRIDANS AND PROCESS FOR THEIR PRODUCTION
Desmond Sheehan, Northford, and Rose Ann Clarke, Greenwich, Conn., assignors to American Cyanamid Company, Stamford, Conn., a corporation of Maine
No Drawing. Filed Nov. 5, 1965, Ser. No. 506,600
U.S. Cl. 260—279   4 Claims
Int. Cl. C07d 37/28; C09k 1/02

ABSTRACT OF THE DISCLOSURE 9-cyanoacridan derivatives and process for their production, and chemiluminescent method of using the acridan compounds.

---

The present invention relates to novel compositions of matter and reactions for the direct generation of light from chemical energy. By "light" as referred to herein is meant electromagnetic radiation at wavelengths falling between 350 mμ and 800 mμ.

The art of generating light from chemical energy, i.e., chemiluminesence, is continually in search of compositions which when reacted substantially improve the intensity and lifetime of light emission. Obviously, improved compositions are constantly in demand for use as signal devices, for area illumination, etc.

The mechanisms by which chemiluminescent light may be generated are so poorly understood that it is not possible at present to predict those structures which convey the chemiluminescent property. This is amply illustrated by the phthalhydrazide series of compounds, some of which are appreciably chemiluminescent and some of which are not substantially nor significantly chemiluminescent [see A. Bernanose, "Bull. Soc. Chim. France," 17, 567 (1950)].

The term "chemiluminescent reactant" as used herein means a mixture which will result in a chemiluminescent reaction (1) independently or (2) when reacted with other necessary reactants in the processes as disclosed herein.

The term "chemiluminescent composition" as used herein means a mixture which includes chemiluminescent reactants, which will result in chemiluminescence.

The term "admixing" as used herein means "reacting" or sufficiently bringing together component reactants to obtain a chemiluminescent reaction.

The term "organohydroperoxide," as used herein, represents a peroxide compounds which includes (1) at least one HOO— group and (2) at least one R— group, or a composition which upon reaction produces such a peroxide compound, where a typical organohydroperoxide is ROOH. R is typically defined as an alkyl hydrocarbon group, substituted or unsubstituted.

The term "organoperacid," as used herein, represents a peroxide compound which includes (1) at least one HOO— group and (2) at least one

group or a composition which upon reaction produces such a peroxide compound. A typical organoperacid is

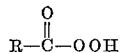

R is defined as an alkyl or an aryl hydrocarbon group, substituted or unsubstituted, for example.

The term "fluorescer-precursor" means a compound which upon a chemiluminescent reaction, which reaction includes the presence of a peroxide compound, produces a compound which is a fluorescer.

The term "fluorescer" includes typical conventional fluorescer as well as any other compound which generates light when irradiated with an ultraviolet or visible "excitation" source.

The term "peroxide compound" as used herein includes typical peroxides such as hydrogen peroxide, hydroperoxides, and organoperoxides such as peroxyacids and diaryl and diaroylperoxides as defined above, etc., and other compounds which upon reaction produce the peroxide group.

The term "hydroperoxide compound," as used herein, represents (a) a peroxide compound which includes at least one HOO— group, in typical compound such as ROOH, or

or HOOH, or (b) a composition which upon reaction produces such a peroxide compound, where a typical hydroperoxide is ROOH, including the perhydrates such as urea peroxide or sodium pyrophosphate peroxide or sodium perborate, as well as alkali metal salts of these peroxides. R is typically defined as any alkyl group, substituted or unsubstituted.

The term "hydrogen peroxide compound" includes (1) hydrogen peroxide and (2) hydrogen peroxide-producing compounds such as urea peroxide, melamine peroxide, sodium perborate, and the like.

By "non-reactive diluent" is meant a diluent which will not react in a manner which will defeat the chemiluminescent reaction.

The term "diluent," as used herein, means a solvent or other vehicle which when employed as or with a solvent does not cause insolubility, and obtains an intimate mixture.

The term "solid," as used herein, refers to a state in which the materials are in the absence of a solvent such as water or other diluent, and the material may be virtually in the form of a single solid state, or of lumps, or of ground or crushed particles, or of a powdery material.

It is an object of this invention to obtain a chemiluminescent composition and a process employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will change the color of the chemiluminescent light, depending upon the fluorescent compound employed.

We have discovered that the objects of this invention are obtained by admixing reactants including (1) a fluorescer-precursor 9-cyanoacridan, defined hereafter, (2) sufficient diluent to form a solution or intimate mixture of reactants, and (3) any conventional hydroperoxide compound and/or organoperacid.

The fluorescer-precursor herein referred to as 9-cyanoacridan is produced by reaction of (1) an alkaline material such as sodium carbonate, sodium hydroxide or potassium hydroxide (or any other one or more hydroxides, alkoxides, or organic acid-salts, or an alkali metal or of an alkaline earth metal) with (2) a 9-cyanoacridinium salt of the formula:

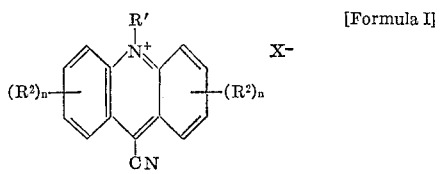

[Formula I]

whereby the fluorescer-precursor 9-cyanoacridan produced is believed to be of the formula:

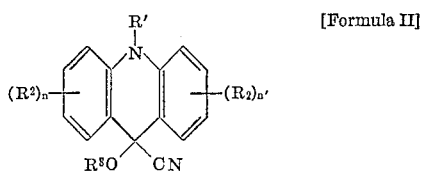

[Formula II]

in which, in both Formula I and Formula II, the R' substituent is hydrogen, or any suitable member such as acyl, aryl, alkyl, substituted and unsubstituted alkyl or aryl or carbonyl, and the like. Specific examples include: methyl, ethyl, dodecyl, phenyl, substituted phenyl, such as 4-methoxyphenyl, 3-cyanophenyl, 2-methylphenyl, 4-phenylphenyl, and substituted alkyl, such as, chloromethyl, methoxymethyl, 2-cyanoethyl, 5-carboxyhexyl; in which $R^2$ is any suitable member such as hydrogen, or alkyl, cycloalkyl, phenyl, alkylamino, alkoxy, halogen, and benz substituent in which $R^3$ is any suitable member such as hydrogen, or alkyl, cycloalkyl, aryl, acyl, or aroyl; in which $X^-$ is any suitable conventional anion such as sulfate, nitrate, sulfonate, halide, phosphate, tetrafluoroborate, perchlorate, acetate, oxalate, and the like; and $n$ and $n'$ each are an integer from zero to and including 4.

PREPARATION OF 9-CYANOACRIDINUM SALTS

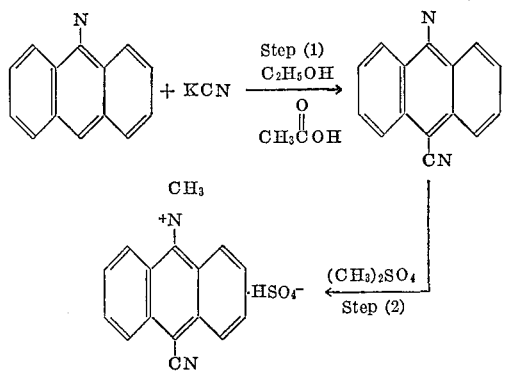

Step (1) Ref.: K. Lehmstedt and F. Doatal, Ber., 72, 804 (1939).
Step (2) Ref.: K. Lehmstedt and Werth, Ber., 61, 2044 (1928).

Obviously a variety of substituted 9-cyanoacridines and 10-alkyl-9-cyanoacridinum salts as in Formula I can be prepared by starting with substituted acridines. Substituents include those indicated above.

In addition, known substituted 9-cyano-acridines are suitable as starting materials, for example as shown in Table I.

TABLE I.—SUBSTITUTED DERIVATIVES OF CYANOACRIDINES AND BENZACRIDINES

| Name of Compound | Reference |
| --- | --- |
| A. 9-cyanoacridines: | |
| 3-chloro-9-cyanoacridine | A. J. Saggiono and J. Weinstock, U.S. Patent 3,016,373, Jan. 9, 1962; U.S. Patent 3,033,866, May 8, 1962. |
| 2-methyl-9-cyanoacridine | N. S. Drozdov and O. M. Cherntsov, Zhur. Obshchei Khim., 21, 1918 (1951). |
| 2-methoxy-9-cyanoacridine | Ibid. |
| 2-methoxy-6-chloro-9-cyanoacridine | G. I. Braz, J. Gen. Chem. (U.S.S.R.), 11, 851 (1941). |
| 2-hydroxy-6-chloro-9-cyanoacridine | Ibid. |
| B. 9-carboalkoxyacridines: | |
| Ethyl 3-chloro-9-acridinecarboxylate | A. J. Saggiono and J. Weinstock. U.S. Patent 3,016,373, January 9, 1962; U.S. Patent 3,003,866, May 8, 1962. P. N. Craig et al., J. Org. Chem., 26, 135 (1961). |
| Methyl 4,5-dimethyl-9-acridinecarboxylate | M. S. Newman and W. H. Powell, J. Org. Chem., 26, 812 (1961). |
| Methyl 1,4,5,8-tetramethyl-9-acridinecarboxylate | Ibid. |

Numerous related acridine compounds are described by R. M. Acheson in Acridines, Interscience Publishers, Inc., New York, 1965, as well as syntheses for acridine derivatives. Acridines having tetra-substituted end rings are mentioned on pages 189, 202, 204, 205, 209, 263, and 272. Compounds having adjacent 1, 9 substituents are described on pages 20, 48, 114 and 202. On page 202, a reaction is shown involving the substitution of the 9 position of a tetra-substituted acridine, 1,2,3,4-tetramethoxy-9-chloroacridine to obtain 1,2,3,4,9-pentamethoxy acridine. Other substituted acridines are mentioned on pages 23, 33, 42, 57, and 59.

The fluorescer-precursor reaction product readily precipitates from the reaction solution of 9-cyanoacridinium salt, wherein any suitable anhydrous solvent is employed such as alcohols (preferably ethanol). If the salt is reacted in the presence of excess water, the acridone is produced directly, and no measurable acridan is produced.

The reaction product of the base with the 9-cyanoacridinium salt has proven difficult to analyze. However, the best available infrared data available indicates that the reaction product is the 9-cyanoacridan, defined above. The applicants are not bound by the theoretical data if subsequent analysis proves the compound to be of another formula. Moreover, the applicants have discovered: (1) a novel method of producing chemiluminescent light by reacting a peroxide with a reaction product of a base and a 9-cyanoacridinium salt identified above; (2) a novel isolatable fluorescer-precursor reaction product of a base and a 9-cyanoacridinium salt, which salt is believed to be a 9-cyanoacridan on the basis of the best available analysis data; and (3) the process of reacting the base with the above identified 9-cyanoacridinium salt.

The peroxide compound employed in the following disclosure means any or more peroxides such as the preferred hydrogen peroxide, or the hydroperoxides.

Typical hydroperoxides include peroxides such as (1) hydrogen peroxide, (2) the organohydroperoxides and the organoperacids, and (3) the like.

Anhydrous hydrogen peroxide which may be typically employed may be prepared from aqueous 90% $H_2O_2$ in a conventional manner, or it may be generated in situ from a perhydrate, for example. Typical perhydrates are perhydrate of urea (urea peroxide), perhydrate of pyrophosphate (sodium pyrophosphate peroxide), perhydrate of histidine (histidine peroxide), and the like. Still another form in which the anhydrous $H_2O_2$ may be provided in the composition is that of an anhydrous solution of $H_2O_2$ in a suitable solvent, such as an ether, an ester, an aromatic hydrocarbon, etc. of the type defined hereinafter and referred to hereinabove as a diluent in the composition.

Typical substantially equivalent organohydroperoxides and organoperacids for purposes of this invention include compounds such as tertiary butyl hydroperoxide, tetralin hydroperoxide, cumene hydroperoxide, cyclohexane hydroperoxide, 1-ethylcyclohexane hydroperoxide, 1-methylcyclohex-2-ene hydroperoxide, n-butyl hydroperoxide, peroxy 4-chlorobenzoic acid, 1-phenyl-1-methylpropyl hydroperoxide, dimethyl-p-methoxyphenyl methyl hydroperoxide, allyl hydroperoxide, triethylmethyl hydroperoxide, 9-xanthenyl hydroperoxide, 9,10-diphenyl-9,10-dihydroanthracene 9,10-dihydroperoxide, indole-3-hydroperoxide, 1,2,3,4-tetrahydrocarbazolyl-4a-hydroperoxide, 9 - amino-10-phenyl-anthracene hydroperoxide or 2,3-dimethylindole-3-hydroperoxide, and the like.

Typical diluents within the purview of the instant discovery are those (1) that do not readily react to frustrate the production of chemiluminescent light of this invention, and/or (2) which may be a liquid form of any one or more of the essential reactants. The peroxide employed must be at least partially soluble in the diluent employed.

Although it is believed that water need not necessarily be added as a reactant in the production of chemiluminescent light in the present invention, water may be necessary for the chemiluminescent reaction. Moreover, water can be present as a solvent or as a supplemental solvent for the 9-cyanoacridinium salt and/or the peroxide employed. Any non-reactive diluent may be employed so long as the peroxide of this invention is at least partially soluble in the diluent.

The following are illustrative of the additional diluents or solvents which may be employed: hot dilute solution of alcohols such as ethanol and the like; chlorinated compounds such as chloroform, methylene chloride and the like; and hot aliphatic hydrocarbons such as cyclohexane, hexane, pentane and the like.

The employment of one or more fluorescent compounds are not necessary in this invention but may be additionally included. Those contemplated herein are numerous and they may be defined broadly as those which do not readily react on contact with the peroxide of this invention; likewise, they typically do not readily react with bis-(acid halides) or anhydrides thereof. Typical suitable fluorescent compounds which may be also used with the present invention are those which have a spectral emission falling between 330 millimicrons and 700 millimicrons and which are at least partially soluble in any of the above diluents, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substitutents which do not interfere with the light-generating reaction contemplated herein.

Numerous other fluorescent compounds having the properties given hereinabove are well-known in the art, such as, for example, trans-stilbene, 1,3-diphenyl isobenzofuran, pentaphenyl phosphole oxide, 10-methyl-9-acridanone, and the like. Many of these are fully described in "Fluorescence and Phosphorescence," by Peter Pringsheim, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that also a fluorescent or fluorescer-producing (1) organohydroperoxide, (2) organoperacid, or (3) organoperoxyoxalyl halide may additionally be employed, including typical fluorescer peroxides such as (1) dimethyl-2-anthracenylmethane hydroperoxide and (2) 2-carboperoxyanthracene, respectively.

The fluorescent-precursor 9-cyanoacridinium salt, as noted above, is the sole essential fluorescer. Whatever fluorescent compounds are employed, total concentration is normally present in the range from about $10^{-5}$ to 5, preferably $10^{-4}$ to $10^{-1}$ molar and the diluent employed must be present in a sufficient amount for the reactants involved to obtain the chemiluminescent reaction.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative compositions may be prepared which may be stored over an extended period of time and which may be admixed with the final ingredient at a time when the chemiluminescent lighting is desired. For example, the composition may be a composition which includes (1) a solid (dry) 9-cyanoacridan, and (2) a solid (dry) peroxide compound, such as sodium perborate. However, if a solid peroxide is present, the addition of water will cause the chemiluminescent process to proceed substantially instantly. A typical alternative composition would be a composition which includes the 9-cyanoacridan reactant, and a diluent, but which does not include a peroxide compound. The preferred compositions which would be less than all necessary components to produce a chemiluminescent light, and would be a composition which would be substantially stable to a practical degree over an extended period of time; otherwise, there would be no real advantage in forming a chemiluminescent reactant to be employed in a subsequent chemiluminescent reaction. Another typical composition, for example, could be an admixture of (1) one or more 9-cyanoacridan with (2) a solid (dry) perhydrate peroxide.

The chemiluminescent reaction process of this invention may be carried out at any temperature below boiling. Temperature is not critical, except to the extent that with particular diluents, an elevated (hot) temperature is necessary to retain the 9-cyanoacridan in solution.

The pH of the reaction media (mixture) is typically about neutral, but may include a basic compound such as $C_5H_5N$, triethylamine, KOH, etc. and a greater intensity may be expected in alkaline pH. However, an advantage of this invention is that hydroxide is not a required reactant to produce chemiluminescent light from a solid 9-cyanoacridan of this invention.

The order of addition of the reactants in the chemiluminescent reaction is not critical, except as noted above regarding water addition.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular additional fluorescent component employed in the reaction mixture, and the particular compound of this invention that is employed.

In the practice of the process of this invention, the mechanism of the chemiluminescent reaction is believed to be as follows. As an example, a typical 9-cyanoacridan is illustrated.

A typical fluorescent-precursor of this invention is the preferred 9-cyano-10-methylacridan of the formula:

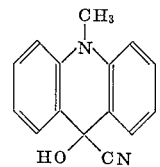

The alkali-metal or alkaline-earth-metal reactant which may be reacted with the 9-cyanoacridinium reactant salt may be represented by the formula $R^4OA$, where $R^4$ is typically a member such as hydrogen, alkyl, cycloalkyl, aryl, acyl, aroyl, and the like. Thus, the reactant may be a hydroxide, an alkoxide, or the acid salt, of an alkali metal or of an alkaline-earth-metal.

When hydrogen peroxide in aqueous diluent is added the cyano group is removed, forming N-methyl acridone which fluoresces.

Although the above-represented reactions are believed to be correct, the applicants are not to be bound by the above theory of reaction.

Pursuant to the present invention disclosed herein, bright light is generated and the light emissions last longer than that of many art-known aqueous compositions described hereinbefore, such as oxalyl chloride.

The following examples are intended to illustrate the present invention and are in no way intended to limit the invention except as limited in the appended claims.

Example 1

An aqueous solution, 2 ml., of ca. 5 mg. of 9-cyano-10-methylacridinium methosulfate is treated with 2 ml. of aqueous 20% sodium hydroxide solution. A solid precipitates which is identified as 10-methylacridone, thereby illustrating that an acridan is not produced in the presence of an excess of water.

Example 2

A suspension of 100 mg. of 9-cyano-10-methylacridinium methosulfate in 20 ml. of ethanol is treated with 3 ml. of aqueous 20% sodium hydroxide solution. A flocculent yellow solid forms. Based on the infra-red spectrum, this material is identified as 9-cyano-9-hydroxy-10-methylacridan, thereby illustrating that in the presence of a minor amount of water, acridan is produced. Other methods of analysis failed to indicate the structure.

Example 3

A solution of 5 mg. of 9-cyano-9-hydroxy-10-methylacridan in 5 ml. of water is treated with 1 ml. of 30% aqueous hydrogen peroxide. A medium intensity blue chemiluminescence is observed.

Example 4

Sodium methoxide is prepared in situ by dissolving 0.4 g. of sodium in 50 ml. of anhydrous methanol. To this solution is added 3 g. of 9-cyano-10-methylacridinium methosulfate. The solution is stirred for several hours at room temperature. While crystals then precipitate which are characterized as 9 - cyano - 9 - methoxy-10-methylacridan by infrared spectrum, thereby illustrating the production of an acridan by the use of the sodium methoxide alkaline material.

Example 5

Ten ml. of an aqueous solution of 30% hydrogen peroxide is treated with about 5 mg. of 9-cyano-9-methoxy-10-methylacridan and about 2.2 g. of sodium hydroxide. A medium-intensity blue light is observed. Light intensity obtained is greater in the presence of sodium hydroxide.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light. Embodiments of this invention also included, for example, are systems in which (1) two or more immiscible diluents are employed in which part of the necessary reactants are in one solvent and other reactants are in another solvent, and in which the diluents have a common interface, and (2) a diluent containing a reactant which is insoluble whereby the chemiluminescent reaction occurs at the point of contact between the diluent and the insoluble reactant.

We claim:

1. A process for producing a chemiluminescent-fluorescer-precursor reactant comprising reacting (1) an alkaline material and (2) a 9-cyanoacridinium salt of the formula:

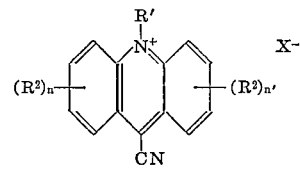

in which R' is selected from the group consisting of alkyl, alkyl mono-substituted with chloro, methoxy, cyano and carboxy, and phenyl in which $R^2$ is selected from the group consisting of hydrogen, alkyl, cycloalkyl, alkylamino, alkoxy, phenyl and halogen; in which $X^-$ is an anion; and in which each of $n$ and $n'$ is an integer from zero to 4.

2. A process of claim 1, in which said alkaline material comprises a hydroxide.

3. A compound of the formula:

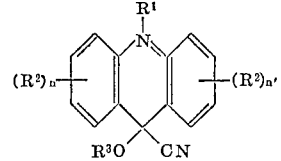

in which $R^1$, $R^2$, $n$ and $n'$ are each defined according to claim 1, and in which $R^3$ is selected from the group consisting of hydrogen, alkyl, cycloalkyl, aryl, acyl, and aroyl.

4. A compound according to claim 3, in which R' is methyl, $n$ and $n'$ are each zero, and $R^3$ is hydrogen.

References Cited

UNITED STATES PATENTS 3,021,334  2/1962  Smart _____ 260—279
3,033,866  5/1962  Saggiomo _____ 260—279

ALEX MAZEL, *Primary Examiner.*

D. G. DAVIS, *Assistant Examiner.*

U.S. Cl. X.R.

250—42; 252—301.2; 260—502, 326.13, 335, 315, 346.2